United States Patent
Bhatia et al.

(10) Patent No.: US 8,875,303 B2
(45) Date of Patent: Oct. 28, 2014

(54) DETECTING PIRATED APPLICATIONS

(75) Inventors: Ashish Bhatia, Mountain View, CA (US); Min Gyung Kang, Sunnyvale, CA (US); Monirul Islam Sharif, San Jose, CA (US); Niels Provos, Mountain View, CA (US); Panayiotis Mavrommatis, Menlo Park, CA (US); Sruthi Bandhakavi, San Mateo, CA (US)

(73) Assignee: Google Inc., Mountain View, CA (US)

( * ) Notice: Subject to any disclaimer, the term of this patent is extended or adjusted under 35 U.S.C. 154(b) by 107 days.

(21) Appl. No.: 13/565,304

(22) Filed: Aug. 2, 2012

(65) Prior Publication Data

US 2014/0041037 A1    Feb. 6, 2014

(51) Int. Cl.
  *G06F 7/04* (2006.01)
  *G06F 7/00* (2006.01)
  *G06F 21/10* (2013.01)
  *G06F 21/60* (2013.01)
  *G06Q 50/18* (2012.01)
  *G06F 21/12* (2013.01)

(52) U.S. Cl.
  CPC ........... *G06F 21/10* (2013.01); *G06F 21/121* (2013.01); *G06F 21/105* (2013.01); *G06F 21/60* (2013.01); *G06Q 50/184* (2013.01); *H04L 2463/101* (2013.01)
  USPC .......................................... 726/26; 707/698

(58) Field of Classification Search
  None
  See application file for complete search history.

(56) References Cited

U.S. PATENT DOCUMENTS

| | | | |
|---|---|---|---|
| 7,099,663 B2 | 8/2006 | Lundblade et al. | |
| 7,854,002 B2 | 12/2010 | Mohanan et al. | |
| 7,979,464 B2 * | 7/2011 | Seidel | 707/781 |
| 8,103,590 B2 | 1/2012 | Quoc et al. | |
| 8,352,484 B1 * | 1/2013 | Schneider | 707/758 |
| 8,533,848 B2 * | 9/2013 | Jin et al. | 726/26 |
| 2007/0276823 A1 * | 11/2007 | Borden et al. | 707/5 |
| 2008/0294647 A1 * | 11/2008 | Ramaswamy | 707/10 |
| 2009/0113545 A1 | 4/2009 | Pic et al. | |
| 2009/0144823 A1 | 6/2009 | Lamastra et al. | |
| 2011/0093701 A1 | 4/2011 | Etchegoyen | |
| 2011/0179484 A1 | 7/2011 | Tuvell et al. | |

* cited by examiner

*Primary Examiner* — Fikremariam A Yalew
*Assistant Examiner* — Fatoumata Traore
(74) *Attorney, Agent, or Firm* — Morris & Kamlay LLP (57) ABSTRACT

A method includes receiving a plurality of trusted assets, generating a first signature set for a known software application, and generating a second signature set for a subject software application. Each trusted asset is associated with at least a threshold number of trusted authors. Each signature in the first signature set corresponds to a known asset that is associated with the known software application. Each signature in the second signature set corresponds to a subject asset that is associated with the subject software application. The method further includes generating first and second filtered signature set based on the first and second signature sets, respectively, by excluding signatures corresponding to the trusted assets. The method also includes generating a similarity rating for the subject application based on a comparison of the first filtered signature set and the second filtered signature set.

21 Claims, 5 Drawing Sheets

DETECTING PIRATED APPLICATIONS

BACKGROUND

The term "software piracy" is used to describe a number of activities that involve the unauthorized copying of all or part of a software application. Under the laws of many countries, acts of software piracy include acts of copyright infringement. Software piracy has long been a problem for software developers, and a large number of systems and methods have been developed previously to detect and combat acts of software piracy.

One method for software sales and distribution that has become popular in recent years is an internet-based store that sells software applications for download directly to computer and/or mobile devices. These stores are operated by entities that sell software applications on behalf of third-party developers. In some cases, third parties submit unauthorized copies of applications to these types of stores. For this reason, the entities that operate the stores typically implement measures to detect and exclude pirated applications from the store.

SUMMARY

The disclosure relates to detecting pirated applications.

One aspect of the disclosed embodiments is a method that includes receiving a plurality of trusted assets. Each trusted asset is associated with at least a threshold number of trusted authors. The method also includes generating a first signature set for a known software application and generating a second signature set for a subject software application. Each signature in the first signature set corresponds to a known asset that is associated with the known software application. Each signature in the second signature set corresponds to a subject asset that is associated with the subject software application. The method further includes generating a first filtered signature set based on the first signature set by excluding signatures corresponding to the trusted assets and generating a second filtered set based on the second signature set by excluding signatures corresponding to the trusted assets. The method also includes generating a similarity rating for the subject application based on a comparison of the first filtered signature set and the second filtered signature set.

Another aspect of the disclosed embodiments is an apparatus that includes one or more processors and one or more memory devices for storing program instructions used by the one or more processors. The program instructions, when executed by the one or more processors, cause the one or more processors to receive a plurality of trusted assets, generate a first signature set for a known software application, and generate a second signature set for a subject software application. Each trusted asset is associated with at least a threshold number of trusted authors. Each signature in the first signature set corresponds to a known asset that is associated with the known software application. Each signature in the second signature set corresponds to a subject asset that is associated with the subject software application. The instructions further cause the one or more processors to generate a first filtered signature set based on the first signature set by excluding signatures corresponding to the trusted assets and generate a second filtered signature set based on the second signature set by excluding signatures corresponding to the trusted assets. The program instructions further cause the one or more processors to generate a similarity rating for the subject application based on a comparison of the first filtered signature set and the second filtered signature set.

Another aspect of the disclosed embodiments is a non-transitory computer readable medium including program instructions executable by one or more processors that, when executed, cause the one or more processors to perform operations. The operations include receiving a plurality of trusted assets, generating a first signature set for a known software application, and generating a second signature set for a subject software application. Each trusted asset is associated with at least a threshold number of trusted authors. Each signature in the first signature set corresponds to a known asset that is associated with the known software application. Each signature in the second signature set corresponds to a subject asset that is associated with the subject software application. The operations also include generating a first filtered signature set based on the first signature set by excluding signatures corresponding to the trusted assets and generating a second filtered signature set based on the second signature set by excluding signatures corresponding to the trusted assets. The operations also include generating a similarity rating for the subject application based on a comparison of the first filtered signature set and the second filtered signature set.

BRIEF DESCRIPTION OF THE DRAWINGS

The description herein makes reference to the accompanying drawings wherein like reference numerals refer to like parts throughout the several views, and wherein.

DETAILED DESCRIPTION

The disclosure herein relates to detecting pirated applications. A collection of authorized copies of software applications, which are referred to herein as known software applications, are used as input data for determining whether a subject software application is an unauthorized version of one or more of the known software applications. Instead of comparing the entire applications, the systems and methods described herein perform a comparison based on assets that are included in the subject software application and each of the known software applications. These assets can include, for example, executable software code, data files, image files, and audio files. However, if the subject application includes a large number of assets that are authorized for use in multiple applications, this can lead to a false determination that the subject application is pirated. Such assets could include, for example, open source code elements and images or other media files that are freely licensed by third-party content providers. In order to prevent false positive results, the systems and methods herein filter these types of assets from the comparison. The determination as to which assets are considered to be trusted assets can be made based on data associated with the known software applications.

Figure 1:
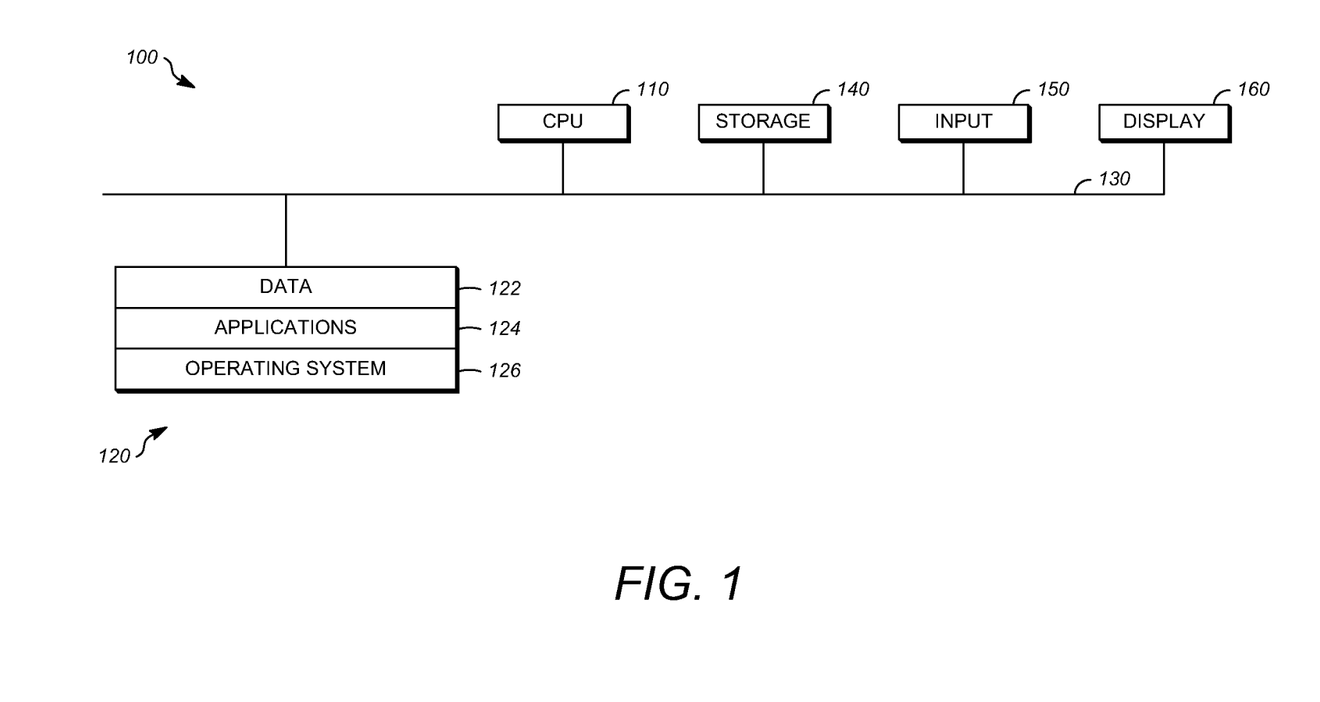
FIG. 1 is a block diagram showing an example of a host computing device.

FIG. 1 is a block diagram of an example of a hardware configuration for a host computing device 100 that can be utilized to implement a system for detecting pirated applications. The host computing device 100 can include a CPU 110. The CPU 110 of the host computing device 100 can be a conventional central processing unit. Alternatively, the CPU 110 can be any other type of device, or multiple devices, capable of manipulating or processing information now-existing or hereafter developed. Although the disclosed examples can be practiced with a single processor as shown, e.g. CPU 110, advantages in speed and efficiency can be achieved using more than one processor.

The host computing device 100 can include memory 120, such as a random access memory device (RAM). Any other suitable type of storage device can be used as the memory 120. The memory 120 can include code and data 122 that can be accessed by the CPU 110 using a bus 130. The memory 120 can further include one or more application programs 124 and an operating system 126. The application programs 124 can include software components in the form of computer executable program instructions that cause the CPU 110 to perform the operations and methods described herein.

A storage device 140 can be optionally provided in the form of any suitable computer readable medium, such as a hard disc drive, a memory device, a flash drive or an optical drive. One or more input devices 150, such as a keyboard, a mouse, or a gesture sensitive input device, receive user inputs and can output signals or data indicative of the user inputs to the CPU 110. One or more output devices can be provided, such as a display device 160. The display device 160, such as liquid crystal display (LCD) or a cathode-ray tube (CRT), allows output to be presented to a user, for example, in response to receiving a video signal.

Although FIG. 1 depicts the CPU 110 and the memory 120 of the host computing device 100 as being integrated into a single unit, other configurations can be utilized. The operations of the CPU 110 can be distributed across multiple machines (each machine having one or more of processors) which can be coupled directly or across a local area or other network. The memory 120 can be distributed across multiple machines such as network-based memory or memory in multiple machines performing the operations of the host computing device 100. Although depicted here as a single bus, the bus 130 of the host computing device 100 can be composed of multiple buses. Further, the storage device 140 can be directly coupled to the other components of the host computing device 100 or can be accessed via a network and can comprise a single integrated unit such as a memory card or multiple units such as multiple memory cards. The host computing device 100 can thus be implemented in a wide variety of configurations.

Figure 2:
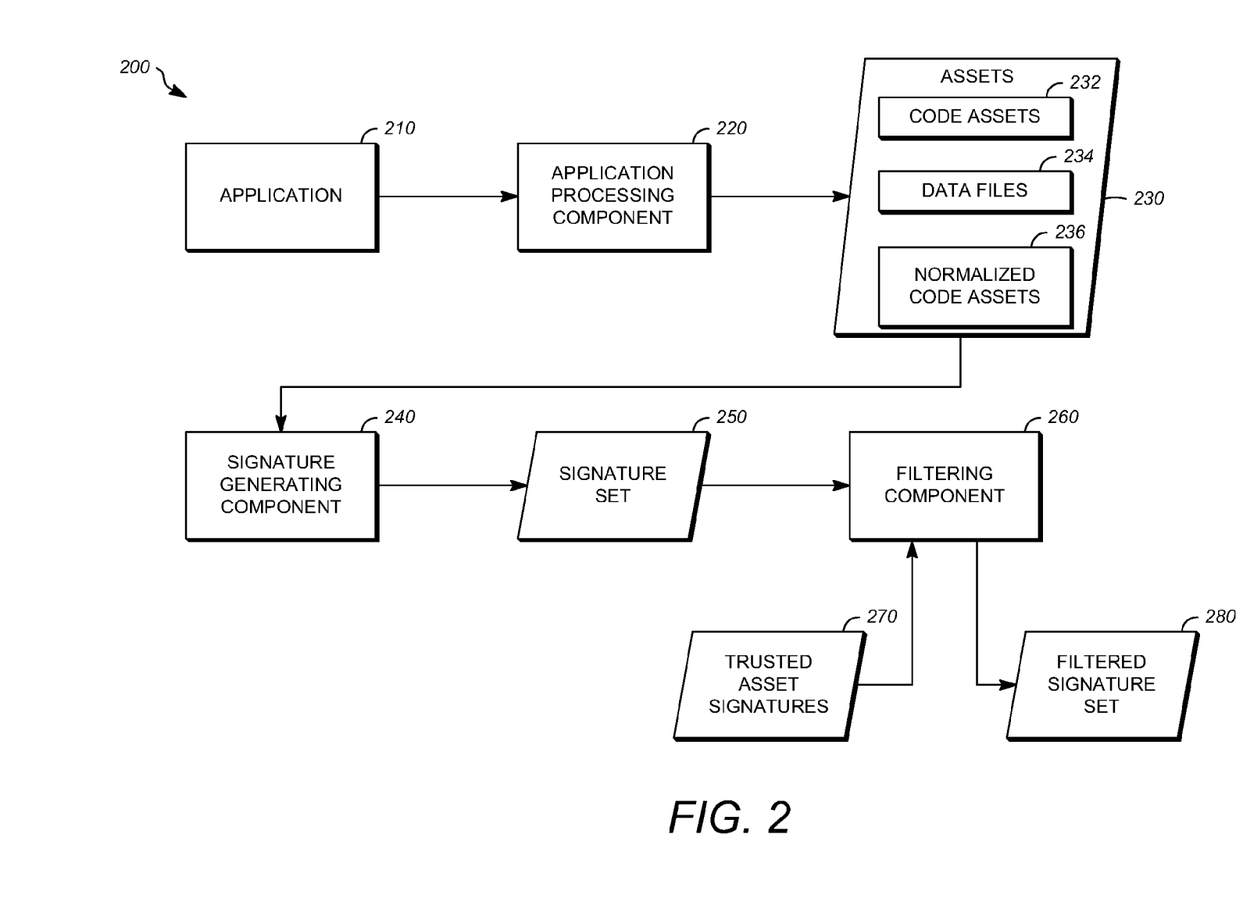
FIG. 2 is a block diagram showing an example of processing an application.

FIG. 2 is a block diagram showing an example of a system 200 for processing an application 210 for analysis by the system for detecting pirated applications. The system 200 can be implemented by the host computing device 100, which can be configured according to the example described in connection with FIG. 1. Other configurations can be utilized for the host computing device 100

The application 210 can be an application that has been received by the host computing device 100. As examples, the application 210 can be received by the host computing device 100 by transmission over a network or by retrieval from a memory or storage device, such as the memory 120 or the storage device 140 of the host computing device 100.

The application 210 can be provided to an application processing component 220 as an input. As outputs, the application processing component generates and stores one or more assets that are included in the application 210, are associated with the application 210, or are generated based on the application 210. The application processing component 220 can be, for example, a software component that is executed by the host computing device 100.

As an example, the application 210 can be provided in the form of a single archive file. One example of a type of application that is distributed in an archive file is an application formatted in the APK application format used by the Android operating system. In this example, the application processing component 220 is operable to extract and store each of the assets 230 from the application 210.

The assets 230 can include code assets 232 and data files 234. The code assets 232 can be executable code assets. As an example, the code assets can be compiled or decompiled java classes. Other types of file formats can be utilized for the code assets 232. Also, the code assets 232 can be extracted and stored as they appear within the application 210 or can be converted into another language.

In some implementations, the code assets 232 are normalized by the application processing component 220. The normalized versions of the code assets 232 are stored as normalized code assets 236. For example, the application processing component 220 can apply a normalizing algorithm to each of the code assets 232 that preserves the code structure while ignoring or genericizing non-standard method names, class names, and variable names. By normalizing the code assets 232, a pair of code assets 232 can be compared for similarity without regard to changes that have been made to elements such as method names, class names, and variable names.

The assets 230, after being generated by the application processing component 220, can be stored for later use. For example, the assets 230 can be stored at the storage device 140 of the host computing device 100.

The assets 230 can be accepted by a signature generating component 240 as inputs. The signature generating component 240 can be, for example, a software component that is executed by the host computing device 100.

The signature generating component 240 can generate a unique or non-unique signature in any suitable form for each of the assets 230, such as the code assets 232, the data files 234, and the normalized code assets 236. The signature generating component 240 can, for example, employ an algorithm that will always generate the same output when given a specified input. The signatures that are generated by the signature generating component can, in some implementations, be fixed length alphanumeric strings. Generally, the signatures are many orders of magnitude shorter than the assets 230. As one example, the signature generating component 240 can output a hash code for each of the assets 230, using any of a number of well-known algorithms. One suitable type of hash code is an SHA 256 digest. These algorithms, or any other suitable algorithms now known or later developed can be utilized by the signature generating component 240.

The signatures corresponding to the assets 230 can be output by the signature generating component 240 as a signature set 250. The signature set 250 can be stored for later use, for example, at the storage device 140 of the host computing device 100.

A filtering component 260 can be utilized to further process the signature set 250. If the signature set 250 is used as a basis for comparing the application 210 to other applications to determine similarities, false positive results could be produced if the application 210 includes assets 230 that commonly appear in other applications as well. Examples of such assets can include open source software code elements and commonly licensed data files, such as images that are associated with third-party services that are utilized by the application 210. One example of such an image can be an icon that is utilized as a button for posting content to a third party social networking service. To reduce false positive results, the filtering component 260 can be operable to analyze the signature set 250 to exclude signatures to corresponding to assets that are commonly incorporated in many applications, which are sometimes referred to herein as trusted assets. The filtering component 260 can be, for example, a software component that is executed by the host computing device 100.

The filtering component 260 can accept the signature set 250 and a set of trusted asset signatures 270 as inputs. As an output, the filtering component can produce a filtered signature set 280. The filtered signature set 280 can be produced by including the signatures from the signature set 250 that are not present within the set of trusted asset signatures 270, while excluding the signatures from the signature set 250 that are included in the set of trusted asset signatures 270.

Figure 3:
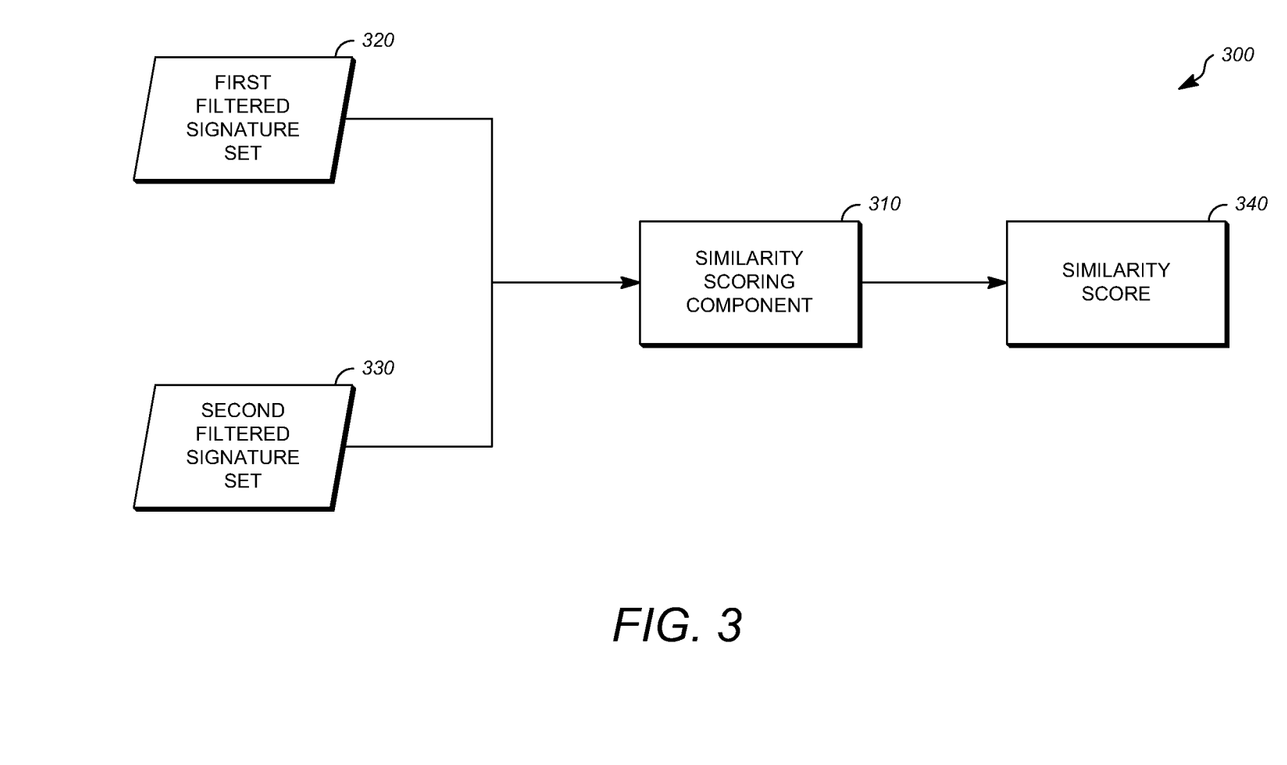
FIG. 3 is a block diagram showing an example of similarity scoring.

FIG. 3 is a block diagram showing a scoring stage 300 of the system for detecting pirated applications. A similarity scoring component 310 can accept a first filtered signature set 320 and a second filtered signature set 330 as inputs. The similarity scoring component 310 generates a similarity score 340 as an output. The similarity scoring component 310 can be, for example, a software component that is executed by the host computing device 100.

The first filtered signature set 320 and the second filtered signature set 330 are analogous to the filtered signature set 280 and correspond to an application, such as the application 210, as explained with reference to FIG. 2. The first filtered signature set 320 can correspond to a subject application, which is an application that is being analyzed to determine a likelihood that it is a pirated application. Accordingly, the similarity score 340 can represent a likelihood that the application corresponding to the first filtered signature set 320 is a pirated application. The second filtered signature set 330 can correspond to a known application. One or more criteria can be applied to qualify an application as a known application. These criteria can be selected such that it is improbable or impossible that the known application is an unauthorized copy of the subject application. For example, an application can qualify as a known application if the host computing device 100 received the known application prior to receiving the subject application. As another example, an application can be classified as a known application if it has been installed by more than a threshold number of users. As another example, an application can be qualified as a known application if it is based on a ratio of installations of the known application relative to a ratio of installations of the subject application. These and other factors can be used alone or in combination as a basis for classifying applications as known applications.

The similarity score 340 can represent the amount of content in the subject application that is also found in the known application. For example, the similarity score 340 can be generated by comparing the signatures in the first filtered signature set 320 to the signatures in the second filtered signature set 330, in which case, the similarity score can represent the number of signatures from the first filtered signature set 320 that are included in the second filtered signature set 330. For example, the similarity score can be a percentage or ratio that represents the number of signatures from the first filtered signature set 320 that are included in the second filtered signature set 330. Other calculations and criteria can be used to generate the similarity score 340.

Figure 4:
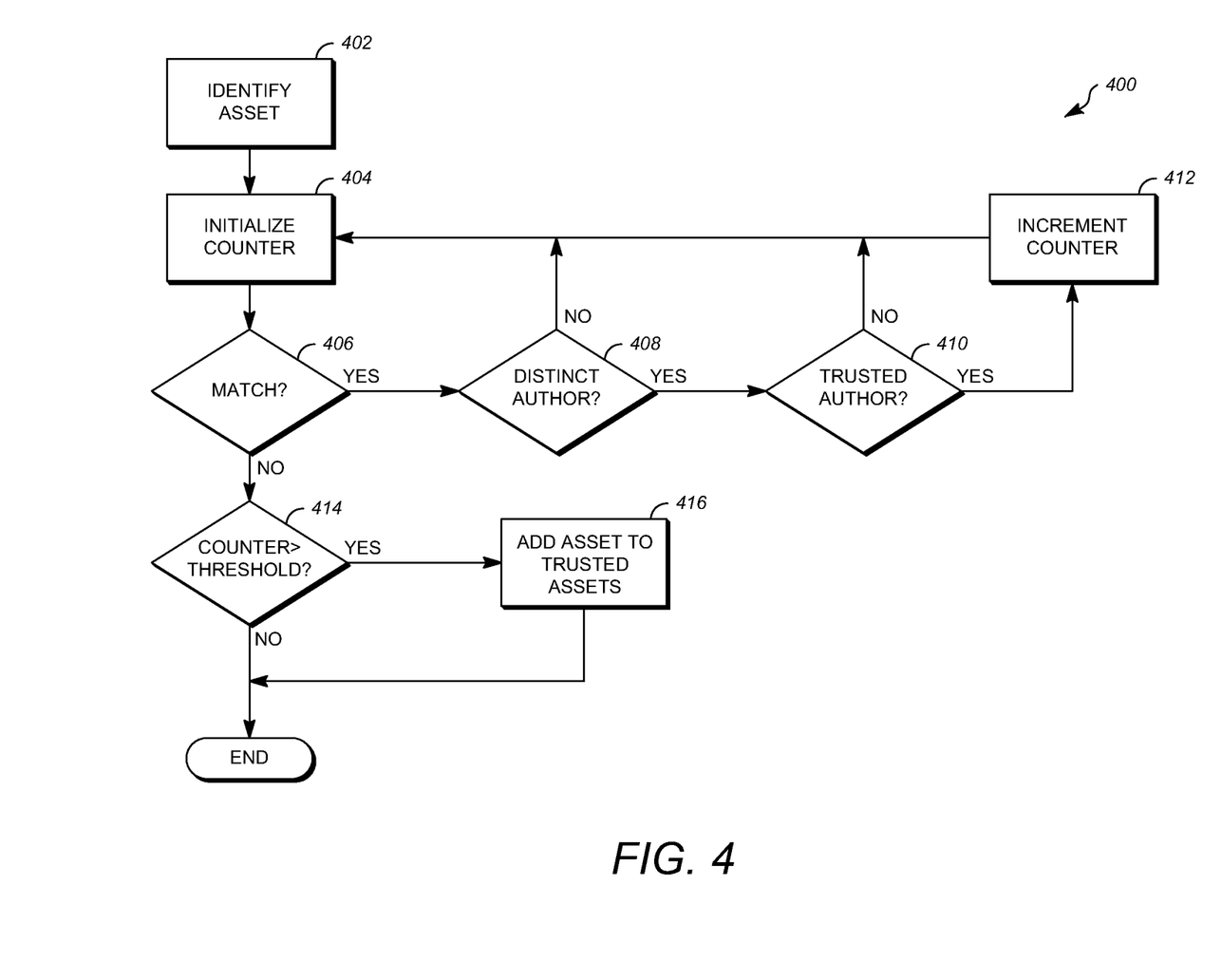
FIG. 4 is a flowchart showing an example of a process for identifying trusted assets.

FIG. 4 is a flow chart showing an example of a process 400 for identifying trusted assets. The process 400 can identify trusted assets based on a number of applications that the asset is associated with. Criteria can be applied to prevent unauthorized copies of assets from inadvertently being utilized to cause an asset to be identified as a trusted asset. For example, occurrences of an asset can be counted only when they are associated with a trusted author, that is an author having an application that has been installed at least a predetermined threshold number of times. Furthermore, multiple occurrences of an asset can be ignored when those occurrences are all associated with a single author.

The operations described in connection with the process 400 can be performed at one or more server computers, such as the host computing device 100. When an operation is performed by one or more computers, it is completed when it is performed by one computer. The operations described in connection with the process 400 can be embodied as a non-transitory computer readable medium including program instructions executable by one or more processors that, when executed, cause the one or more processors to perform the operations. For example, the operations described in connection with the process 400 could be stored at the memory 120 of the host computing device 100 and be executable by the CPU 110 of the host computing device 100.

At operation 402, an asset is identified for analysis. The identified asset can be, for example, one of the assets 230, as discussed in connection with FIG. 2. Identification of an asset for analysis can occur in any manner. As one example, an asset is identified for analysis when it is first received by the host computing device 100, such as when the assets 230 are extracted from the application 210 as discussed with respect to the application processing component 220. As another example, an asset can be identified for analysis when a request is received from an external computing system, or based on an input made by a user.

In operation 404, a counter is initialized. The counter can be utilized to count the number of times the identified asset has appeared in applications that are associated with distinct trusted authors. The counter can be, for example, a variable that is stored at the memory 120 of the host computing device 100.

In operation 406, a determination is made as to whether the identified asset matches any other known assets. This determination can be made using signatures, such as hash codes, as discussed previously. For example, one of the known assets can be selected for comparison to the identified asset using hash codes. Because operation 406 will be repeated until no further matches are found, all of the known assets can be compared to the identified asset in this manner. If a match is found, the process continues to operation 408 where the matching known asset is analyzed; if no match is found, the process advances to operation 414.

In operation 408, a determination is made as to whether the matching known asset is associated with a distinct author, which is an author that is not associated with the asset identified in operation 402 or any other asset that has previously been identified as matching the asset identified in operation 402. If the author of the matching known asset is not distinct, the process returns to operation 404. If the author of the matching known asset is distinct, the process advances to operation 410. In operation 410, a determination is made as to whether the author associated with the matching known asset is trusted. As one example, the author can be identified as a trusted author if an application install base for the author is greater than a threshold value. For example, if the matching known asset is associated with an application that has been installed by more than one thousand users, it can be determined at operation 410 that the author is trusted. Other criteria could be utilized to determine whether an author is trusted. If it is determined that the author of the matching known asset is not trusted, the process returns to operation 404. If it is determined that the author of the matching known asset is trusted, the process advances to operation 412, where the counter is incremented. The process then returns to operation 404.

Once no further matches are detected at operation 406, the process advances to operation 414. At operation 414, the counter is compared to a threshold to determine whether the asset is associated with at least a threshold number of distinct trusted authors. As one example, the threshold could be ten trusted authors. If the counter is greater than the threshold at operation 414, the process advances to operation 416. If the counter is not greater than the threshold at operation 414, the process ends.

At operation 416, the asset identified at operation 402 is added to a list of trusted assets. This can be done, for example, by modifying data associated with the asset, such as a database entry or other metadata. The signatures corresponding to the asset can then be included within the set of trusted asset signatures 270, as described in connected with FIG. 2. After operation 416, the process ends.

Figure 5:
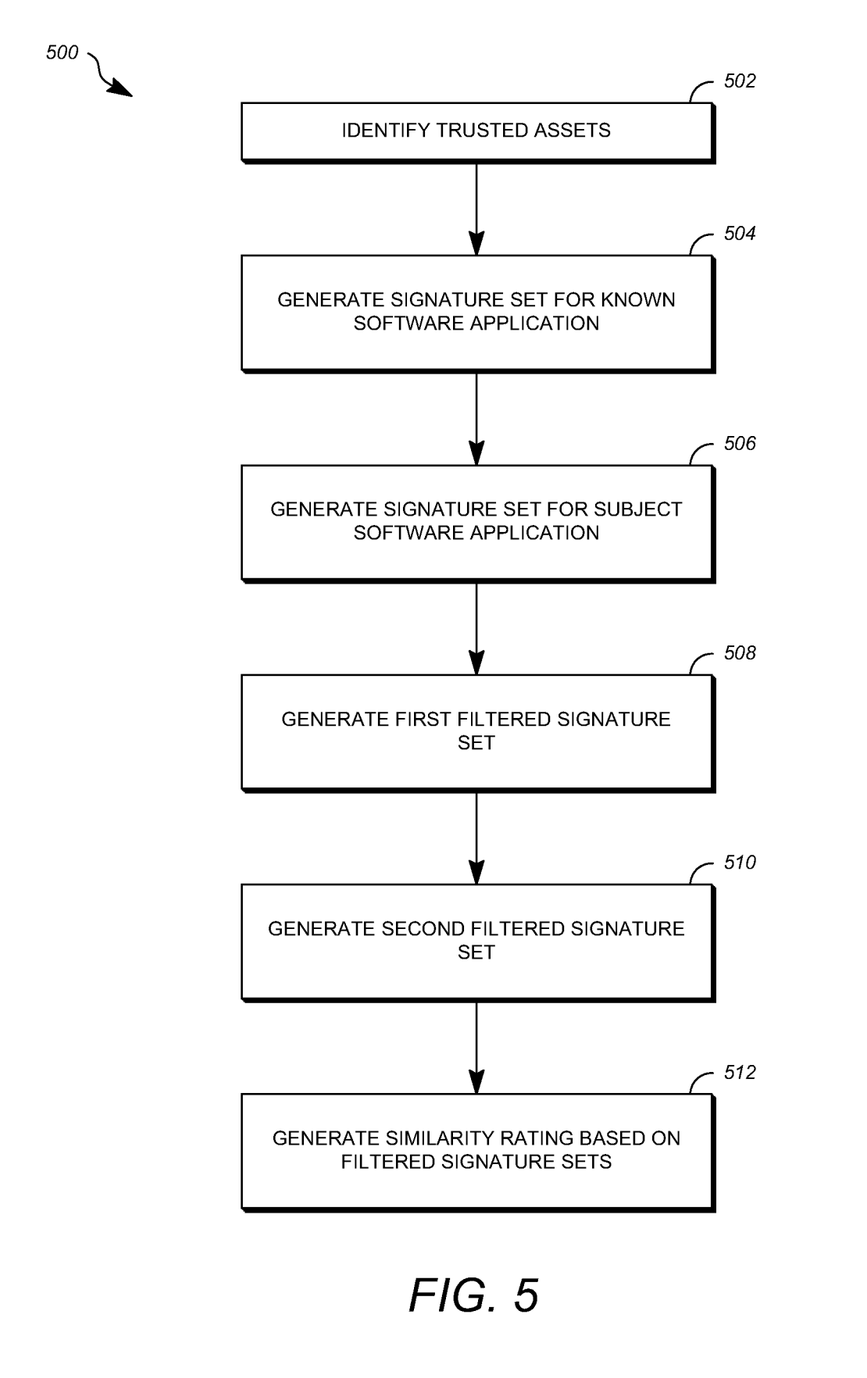
FIG. 5 is a flowchart showing an example of a process for detecting pirated applications.

FIG. 5 is a flow chart showing an example of a process for detected pirated applications. The operations described in connection with the process 600 can be performed at one or more computers or computing devices, such as the host computing device 100. When an operation is performed by one or more computers, it is completed when it is performed by one computer. The operations described in connection with the process 500 can be embodied as a non-transitory medium including program instructions executable by one or more processors that, when executed, cause the one or more prosecutors to perform the operations. For example, the operations described in connection with the process 500 could be stored at the memory 120 of the host computing device 100 and be executable by the CPU 110 of the host computing device 100.

In operation 502, trusted assets are identified. The trusted assets are those assets whose presence within an application are not considered to be indicative of unauthorized copying. As one example, the host computing device 100 can identify the trusted assets in the manner described in connection with the process 400, and this identification of trusted assets can be used as a basis for compiling the set of trusted asset signatures 270.

In operation 504, a signature set is generated for a known software application. As previously discussed, the known software application is an application that is not believed to be an unauthorized copy of another application. As one example, the signature set for the known software application can be generated by the host computing device 100 in the manner described in connection with the signature generating component 240.

In operation 506, a signature set is generated for a subject software application. The subject software application is the application that is being analyzed to determine whether it may be an unauthorized copy of one or more of the known software applications. As one example, the signature set for the subject software application can be generated by the host computing device in the manner described in connection with the signature generating component 240.

In operation 508, a first filtered signature set is generated. The first filtered signature set corresponds to the known software application and can be generated based on the signature set for the known software application in addition to the signatures corresponding to the trusted assets that were identified in operation 502. As one example, the first filtered signature set can be generated by the host computing device 100 in the manner discussed in connection with the filtering component 260.

In operation 510, a second filtered signature set is generated. The second filtered signature set corresponds to the subject software application and can be generated by excluding signatures corresponding to the trusted assets identified in operation 502 from the signature set that was generated for the known software application in operation 504. As one example, the second filtered signature set can be generated by the host computing device 100 in the manner discussed in connection with the filtering component 260.

In operation 512, a similarity rating is generated based on the first filtered signature set from operation 508 and the second filtered signature set from operation 510. In one example, the similarity rating can be based at least in part on a number of signatures from the first signature set that are included in the second filtered signature set. In one example, the similarity rating can be generated in the manner described in connection with the similarity scoring component 310.

Based on the similarity rating generated in operation 512, the subject software application can be flagged for manual review if the similarity rating exceeds a threshold value. Alternatively, an action can be taken automatically by the host computing device 100 with respect to the subject software application based on the similarity rating. For example, if the host computing device 100 is associated with a computing platform for distribution of applications, sometimes commonly referred to as an app store, the subject software application can automatically be removed from distribution by the computing platform.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of the computer devices (e.g., clients and servers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of each of the clients and each of the servers described herein do not necessarily have to be implemented in the same manner.

Operations that are described as being performed by a single processor, computer, or device can be distributed across a number of different processors, computers or devices. Similarly, operations that are described as being performed by different processors, computers, or devices can, in some cases, be performed by a single processor, computer or device.

Although features may be described above or claimed as acting in certain combinations, one or more features of a combination can in some cases be excised from the combination, and the combination may be directed to a sub-combination or variation of a sub-combination.

The systems described herein, such as client computers and server computers, can be implemented using general purpose computers/processors with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

At least one implementation of this disclosure relates to an apparatus for performing the operations herein. This apparatus may be specially constructed for the required purposes, or it may comprise a general-purpose computer selectively activated or reconfigured by a computer program stored on a computer readable storage medium that can be accessed by the computer.

All or a portion of the embodiments of the disclosure can take the form of a computer program product accessible from, for example, a non-transitory computer-usable or computer-readable medium. The computer program, when executed, can carry out any of the respective techniques, algorithms and/or instructions described herein. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed embodiments but, on the contrary, is intended to cover various modifications and equivalent arrangements included within the spirit and scope of the appended claims.

What is claimed is:

1. A method comprising:
   identifying, by a processor, a plurality of trusted assets, wherein each trusted asset is associated with at least a threshold number of trusted authors;
   generating, by a processor, a first signature set for a known software application, wherein each signature in the first signature set corresponds to a known asset that is associated with the known software application;
   generating, by a processor, a second signature set for a subject software application, wherein each signature in the second signature set corresponds to a subject asset that is associated with the subject software application;
   generating, by a processor, a first filtered signature set based on the first signature set by excluding signatures corresponding to the trusted assets;
   generating, by a processor, a second filtered signature set based on the second signature set by excluding signatures corresponding to the trusted assets; and
   generating, by a processor, a similarity rating for the subject application based on a comparison of the first filtered signature set and the second filtered signature set.

2. The method of claim 1, further comprising:
   flagging the subject software for review if the similarity rating exceeds a threshold value.

3. The method of claim 1, wherein the similarity rating is based at least in part on a number of signatures from the first filtered signature set that are included in the second filtered signature set.

4. The method of claim 1, wherein the signatures from the first signature set and the second signature set each include hash codes.

5. The method of claim 1, further comprising:
   identifying the trusted authors by comparing an application install base for each author from a plurality of authors to a threshold value.

6. The method of claim 1, wherein at least some of the known assets and at least some of the subject assets are executable code assets, and generating the first signature set and the second signature set each include generating normalized versions of the executable codes assets such that at least some of the signatures in the first and second signature sets correspond to the normalized versions of the executable code assets.

7. The method of claim 1, wherein at least some of the known assets and at least some of the subject assets are data files.

8. The method of claim 1, wherein at least some of the known assets and at least some of the subject assets are image files.

9. The method of claim 1, wherein at least some of the known assets and at least some of the subject assets are audio files.

10. An apparatus, comprising:
one or more processors; and
one or more memory devices for storing program instructions used by the one or more processors, wherein the program instructions, when executed by the one or more processors, cause the one or more processors to:
identify a plurality of trusted assets, wherein each trusted asset is associated with at least a threshold number of trusted authors,
generate a first signature set for a known software application, wherein each signature in the first signature set corresponds to a known asset that is associated with the known software application,
generate a second signature set for a subject software application, wherein each signature in the second signature set corresponds to a subject asset that is associated with the subject software application,
generate a first filtered signature set based on the first signature set by excluding signatures corresponding to the trusted assets,
generate a second filtered signature set based on the second signature set by excluding signatures corresponding to the trusted assets, and
generate a similarity rating for the subject application based on a comparison of the first filtered signature set and the second filtered signature set.

11. The apparatus of claim 10, wherein the program instructions, when executed by the one or more processors, further cause the one or more processors to flag the subject software application for review if the similarity rating exceeds a threshold value.

12. The apparatus of claim 10, wherein the similarity rating is based at least in part on a number of signatures from the first filtered signature set that are included in the second filtered signature set.

13. The apparatus of claim 10, wherein the signatures from the first signature set and the second signature set each include hash codes.

14. The apparatus of claim 10, wherein the program instructions, when executed by the one or more processors, further cause the one or more processors to identify the trusted authors by comparing an application install base for each author from a plurality of authors to a threshold value.

15. The apparatus of claim 10, wherein at least some of the known assets and at least some of the subject assets are executable code assets, and generating the first signature set and the second signature set each include generating normalized versions of the executable codes assets such that at least some of the signatures in the first and second signature sets correspond to the normalized versions of the executable code assets.

16. A non-transitory computer readable medium including program instructions executable by one or more processors that, when executed, cause the one or more processors to perform operations, the operations comprising:
identifying a plurality of trusted assets, wherein each trusted asset is associated with at least a threshold number of trusted authors;
generating a first signature set for a known software application, wherein each signature in the first signature set corresponds to a known asset that is associated with the known software application;
generating a second signature set for a subject software application, wherein each signature in the second signature set corresponds to a subject asset that is associated with the subject software application;
generating a first filtered signature set based on the first signature set by excluding signatures corresponding to the trusted assets;
generating a second filtered signature set based on the second signature set by excluding signatures corresponding to the trusted assets; and
generating a similarity rating for the subject application based on a comparison of the first filtered signature set and the second filtered signature set.

17. The non-transitory computer readable medium of claim 16, the operations further comprising:
flagging the subject software application for review if the similarity rating exceeds a threshold value.

18. The non-transitory computer readable medium of claim 16, wherein the similarity rating is based at least in part on a number of signatures from the first filtered signature set that are included in the second filtered signature set.

19. The non-transitory computer readable medium of claim 16, wherein the signatures from the first signature set and the second signature set each include hash codes.

20. The non-transitory computer readable medium of claim 16, the operations further comprising:
identifying the trusted authors by comparing an application install base for each author from a plurality of authors to a threshold value.

21. The non-transitory computer readable medium of claim 16, wherein at least some of the known assets and at least some of the subject assets are executable code assets, and generating the first signature set and the second signature set each include generating normalized versions of the executable codes assets such that at least some of the signatures in the first and second signature sets correspond to the normalized versions of the executable code assets.

* * * * *